United States Patent [19]

Collins

[11] 4,191,159
[45] Mar. 4, 1980

[54] SYSTEM FOR SLICING SILICON WAFERS

[76] Inventor: Robert A. Frosch, Administrator of the National Aeronautics and Space Administration, with respect to an invention of Earl R. Collins, La Canada, Calif.

[21] Appl. No.: 951,828

[22] Filed: Oct. 16, 1978

[51] Int. Cl.² ............................................. B28D 1/08
[52] U.S. Cl. ........................................ 125/21; 83/820
[58] Field of Search ............... 125/12, 13 R, 14, 16 R, 125/18, 21; 83/820

[56] References Cited

U.S. PATENT DOCUMENTS

| | | | |
|---|---|---|---|
| 1,662,488 | 3/1928 | Burkhardt | 125/21 |
| 2,369,068 | 2/1945 | Mentzer | 125/21 |
| 2,831,476 | 4/1958 | Wilson | 125/12 |
| 2,896,605 | 7/1959 | Thompson | 125/16 R |
| 3,145,604 | 8/1964 | Foley | 83/820 X |
| 3,461,764 | 8/1969 | Benith | 83/820 |

FOREIGN PATENT DOCUMENTS 446589  9/1948  Canada .................................. 83/820

*Primary Examiner*—Harold D. Whitehead
*Attorney, Agent, or Firm*—Monte F. Mott; John R. Manning; Wilfred Grifka

[57] ABSTRACT

An improved system having at least one endless band saw blade characterized by a continuously regenerated cutting edge and unidirectionally driven along a pair of courses extended in mutual parallelism through a cutting station located near the midportion of said courses. The blade is supported at the cutting station by pairs of guides continuously rotated through less than 360° of angular displacement during each cutting operation for thus continuously regenerating the blade-supporting surfaces of the guide whereby blade wobble substantially is eliminated.

9 Claims, 7 Drawing Figures

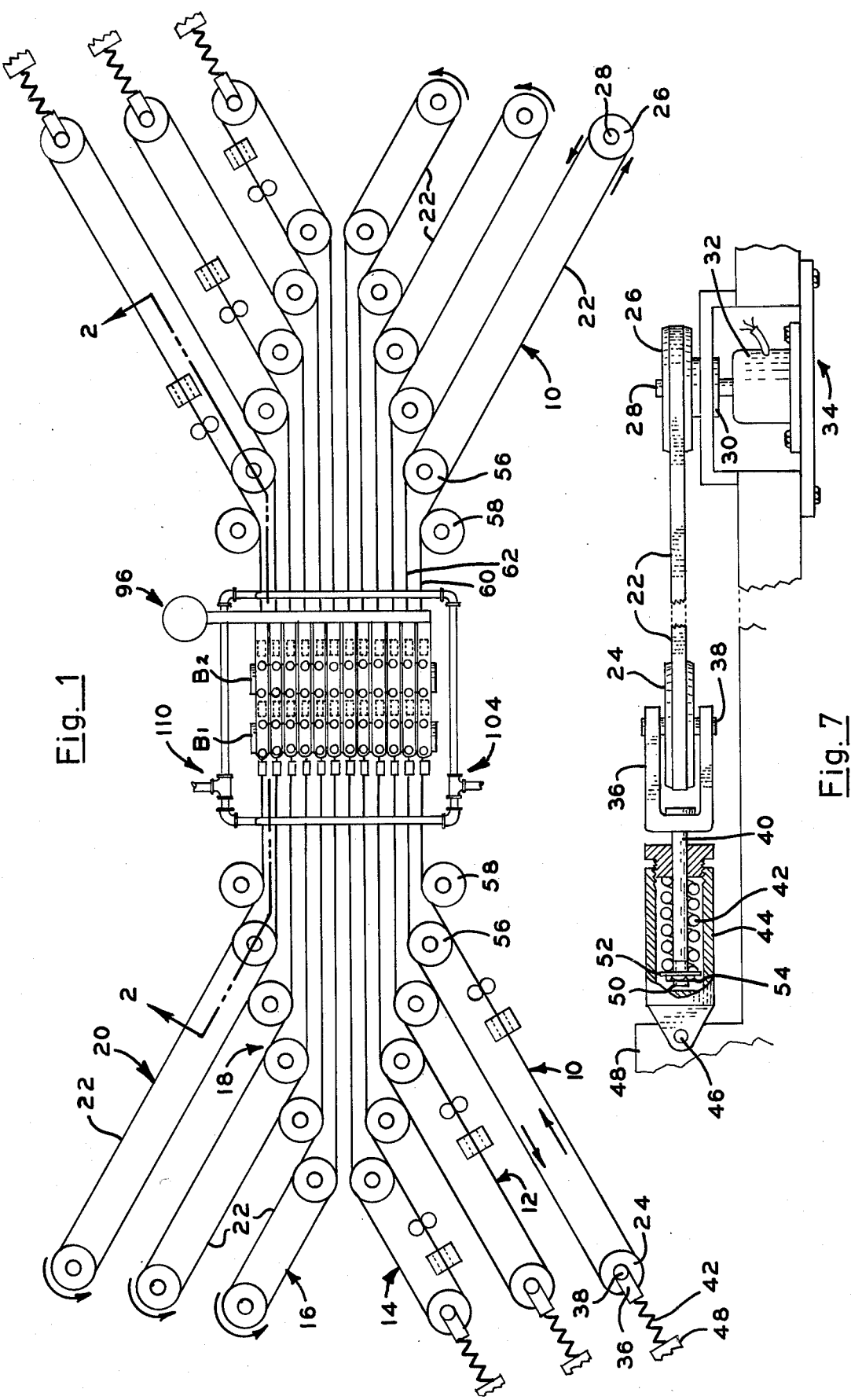

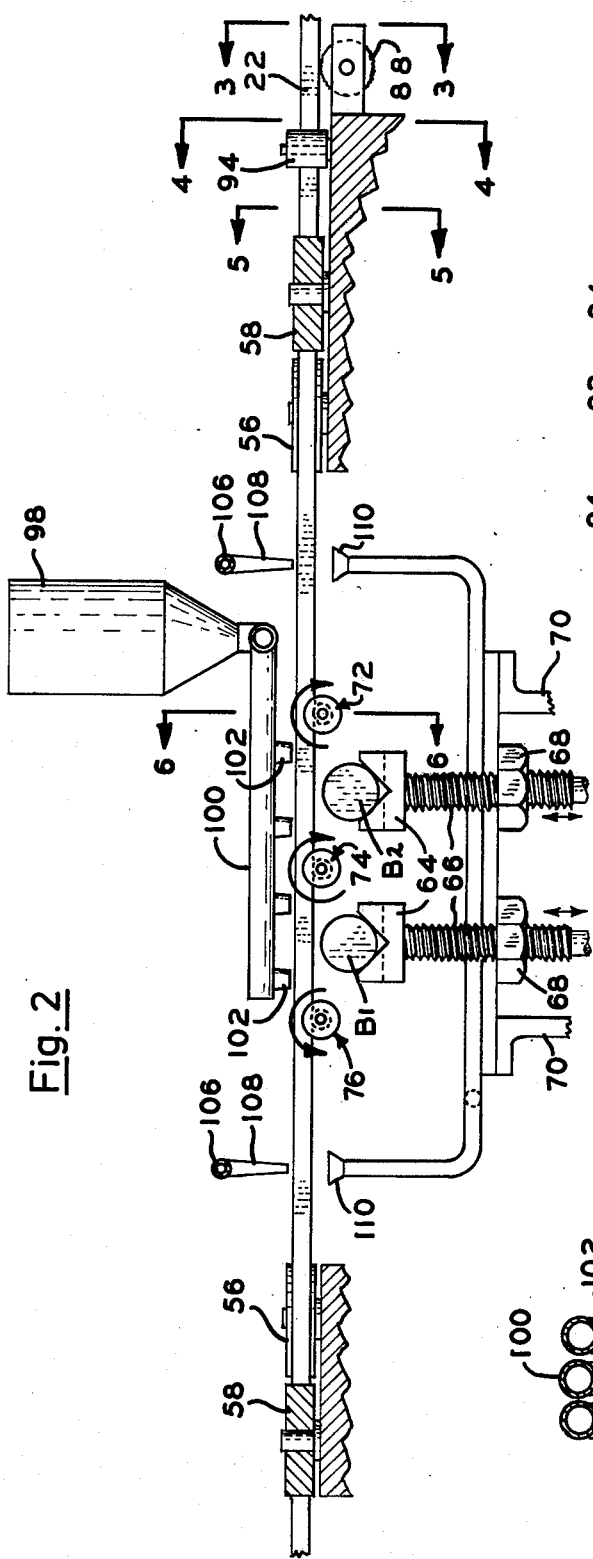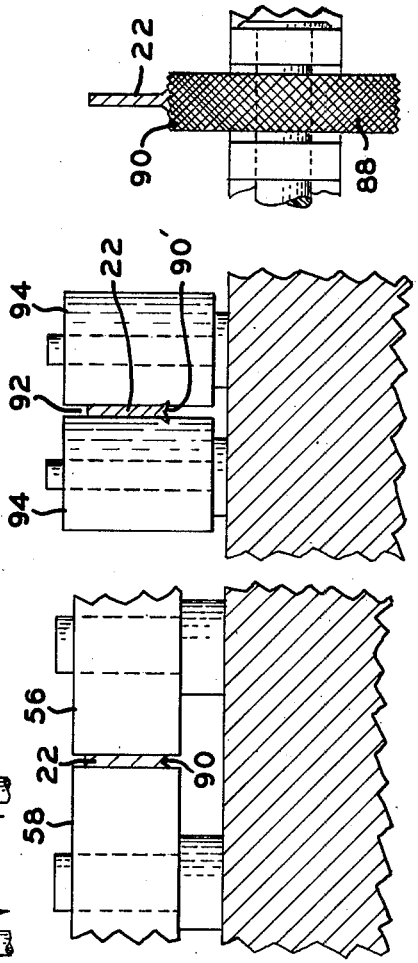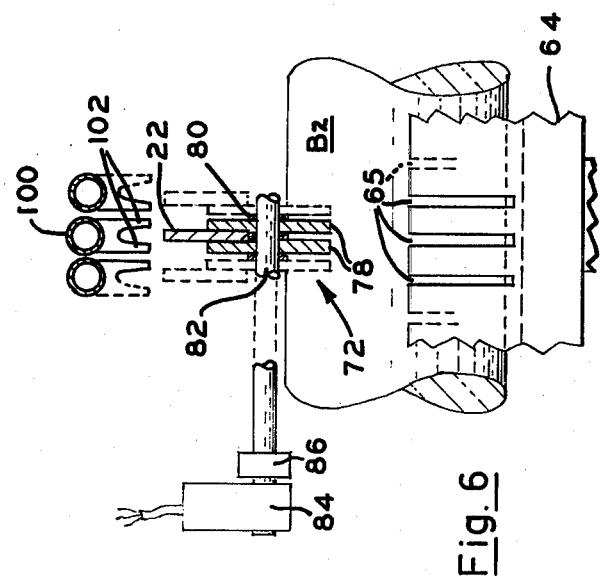

SYSTEM FOR SLICING SILICON WAFERS

ORIGIN OF THE INVENTION

The invention described herein was made in the performance of work under a NASA contract and is subject to the provisions of Section 305 of the National Aeronautics and Space Act of 1958, Public Law 85-568 (72. Stat. 435; 42 USC 2457).

BACKGROUND OF THE INVENTION

1. Field of the Invention

The invention generally relates to a system for slicing silicon wafers from a boule, and more particularly to an improved system wherein a plurality of band saw blades are simultaneously driven at substantially uniform speeds for simultaneously slicing a plurality of wafers from a commonly related plurality of boules.

2. Description of the Prior Art

It is common practice, of course, to form a boule of silicon by drawing from a liquid melt a rapidly cooling quantity of silicon. The resulting boule is then sliced, employing any one of various techniques and further processed for providing silicon wafers to be employed in the semiconductor industry.

As is well known by those familiar with the fabrication of silicon wafers, the prior art includes numerous techniques for cutting or slicing the silicon wafers from boules of silicon. One technique includes a use of an inside diameter saw adapted to rapidly slice the boule but having a capability of forming a single saw kerf, or slice, in a given cutting operation. Another technique requires the use of ganged blades adapted to be reciprocated for forming multiple saw kerfs whereby multiple slices are formed simultaneously. Unfortunately, a use of reciprocating blades tends to result in a very slow process, the use of such blades is further impaired by frequent and costly breakdowns. Finally, the techniques heretofore employed generally are adaptable for slicing only a single boule of silicon in a given operation.

In view of the foregoing, it should readily be apparent that there currently exists a need for a reliable high-speed system having a capability of slicing multiple wafers simultaneously from a plurality of boules, whereby costs of resulting wafers are reduced for thus enhancing terrestrial uses of silicon solar cells.

It is therefore the general purpose of the instant invention to provide an improved system for slicing a plurality of silicon boules simultaneously to provide a multiplicity of smooth slices particularly suited for use in the fabrication of low-cost solar cells.

OBJECTS AND SUMMARY OF THE INVENTION

It is an object of the instant invention to provide an improved system for slicing wafers from boules of silicon.

It is another object to provide an improved system for slicing from a plurality of boules simultaneously a plurality of silicon wafers adapted to be employed in the production of low-cost semiconductor devices.

It is another object to provide an improved system for simultaneously slicing from a plurality of boules a multiplicity of smooth silicon wafers of uniform thickness at an increased rate and with an attendant reduction in waste for thus producing silicon wafers at reduced costs, whereby production of solar cells for terrestrial uses is enhanced.

These together with other objects and advantages are achieved through the use of an improved, high-speed system particularly suited for simultaneously slicing from a plurality of boules, arranged in parallelism, a plurality of smooth silicon wafers of uniform thickness with minimal waste, as will become readily apparent by reference to the following description and claims in light of the accompanying drawings.

DESCRIPTION OF THE DRAWINGS

FIG. 1 is a top plan view of a system embodying the principles of the instant invention which includes ganged endless band saw blades traverising courses extended through a cutting station.

FIG. 2 is a fragmented, side elevational view of the system, on an enlarged scale.

FIG. 3 is a partially sectioned view, taken generally along line 3—3 of FIG. 2.

FIG. 4 is a partially sectioned view, taken generally along line 4—4 of FIG. 2.

FIG. 5 is a partially sectioned view, taken generally along line 5—5 of FIG. 2.

FIG. 6 is a partially sectioned view, taken generally along line 6—6 of FIG. 2.

FIG. 7 is a partially sectioned fragmented view, depicting structure employed in supporting and driving one of the band saw blades shown in FIG. 1.

DESCRIPTION OF THE PREFERRED EMBODIMENT

Referring now to the drawings with more particularity, wherein like reference characters designate like or corresponding parts throughout the several views, there is shown in FIG. 1 a system embodying the principles of the instant invention.

As shown in FIG. 1, the system includes a plurality of subassemblies, designated 10 through 20. It is to be understood, of course, that the subassemblies designated 10 through 20 may be varied in number. Moreover, the subassemblies are of a common design and function collectively for simultaneously slicing a multiplicity of wafers from boules of silicon, a pair of which, designated $B_1$ and $B_2$, are illustrated in FIGS. 1 and 2.

Additionally, it is to be further understood that each of the boules $B_1$ and $B_2$ are formed employing a suitable technique well understood by those familiar with the art of growing silicon for use in the production of solar cells. Accordingly, since neither the details of the boules nor the techniques through which the boules are fabricated form any part of the claimed invention, a detailed description thereof is omitted in the interest of brevity.

Furthermore, since the subassemblies, designated 10 through 20, are of a common design, and function in a similar manner to achieve a similar result, a detailed description of a single one of the subassemblies is believed adequate to provide for a complete understanding of the instant invention. Therefore, a detailed description of the subassembly, designated 10, is provided.

As shown in FIG. 1, the subassembly 10 includes an endless band saw blade 22 trained about a pair of drums 24 and 26. With particular reference to FIG. 7, it can be seen that the drum 26 is supported for rotation by a shaft 28 projected axially through a bearing housing 30. As a practical matter, the bearing housing 30 is supported by suitable structure, not designated, while the shaft 28, in effect, comprises an extension of a rotary output shaft for a motor 32. Where so desired, a gear box, not shown, is interposed between the drum 26 and the motor 32 for use in controlling the operational speeds of the drum.

The motor 32, as shown, comprises an electrically energizable motor of suitable design mounted on a rigid base 34 and acts through the shaft 28 for imparting unidirectional velocity to the drum 26 for advancing the blade 22.

The drum 24, on the other hand, is a free-running drum supported in suspension. While various supporting structures may be employed, as shown, the drum is supported by a clevis 36 of a generally U-shaped configuration having a pin 38 extended perpendicularly between the legs thereof. The extended pin, in practice, functions as an axle for the drum 24. Preferably, the drum 24 also includes a suitable bearing provided for mounting the drum 24 on the pin 38. Hence, the drum 24 comprises a free-running drum supported in suspension by the clevis for rotation about the pin 38.

The clevis 36, as shown, is mounted at one end of a tension shaft 40 supported by a caged helical spring 42. The spring 42 is captured within a cage 44, of known design, pivotally connected by a pin 46 to a suitable anchor 48.

It is important to appreciate fully that the shaft 40 includes a screw threaded end portion 50 adapted to be extended axially through the spring and receive at its distal end a spring retainer subassembly, not designated. However, as shown, this subassembly includes a retainer 52 secured in place by a nut 54 threaded onto the portion 50 of the shaft 40. Consequently, by varying the position of the nut 54 along the screw threaded distal end portion 50 of the shaft 40, the clevis 36 is axially displaced for thus displacing the drum 24, whereby the tension in the blade 22 is varied. Thus the nut 54 serves as an adjustment device for adjusting the tension of the band saw blade 22 trained about the drum 24.

Referring again to FIG. 1, it can be seen that the band saw blade 22, of the subassembly 10, is supported in a substantially truncated chevron configuration by a plurality of idler drums, designated 56 and 58. The idler drums 56 are, in practice, arranged in a first common plane, while the drums 58 are arranged in another common plane, paralleling the first plane for the drums 56. Consequently, the drums 56 and 58 support adjacent midportion segments designated 60 and 62 for unidirectional travel along adjacent paralleling courses through a cutting station, not designated. The blade continuously progresses from upstream to downstream, relative to the boules $B_1$ and $B_2$, with unidirectional, uniform linear motion.

It is to be understood that the idler drums 56 and 58 comprise free-running drums each having a cylindrical surface arranged about the periphery thereof for supporting the band saw blade 22, FIG. 5, as the blade is advanced by the drum 26 in response to driven rotation imparted to the drum by the motor 32.

Turning for a moment to FIG. 2, it can be seen that the boules $B_1$ and $B_2$ are supported by cradles 64, of any suitable design, having defined therein reliefs 65, FIG. 6, through which passage of the blades 22 is facilitated. As shown, the cradles are mounted at the upper end of suitably supported jack screws 66 connected thereto in a manner such that rotary motion of the jack screws is accommodated. A bearing collar, not shown, serves quite satisfactorily for coupling the cradles with the jack screws. The jack screws 66, where so desired, are extended through internally threaded blocks 68 supported by a rigid base 70. The jack screws 66 are provided with an external thread mated with the threads of the blades 68 and are coupled in a driven relationship to a rotary drive, not shown. It will, of course, be understood that the rotary drive is of a design suitable for driving the jacks screws in rotation whereby vertical displacement in opposite directions is imparted to the screws as they rotate within the blocks 68.

As best seen in FIG. 2, the band saw blade 22 is supported by rotary guides 72, 74 and 76, of a common design. Since the guides 72, 74 and 76 are of a common design, a detailed description of the guide 72 is deemed adequate to provide for a complete understanding of the instant invention.

Accordingly, attention is kindly invited to FIG. 6 wherein there is more clearly illustrated the guide 72. The guide 72 includes a pair of disks 78 of a first diameter for imparting lateral support to the blade 22. Between these disks there is disposed a disk 80 of a lesser diameter which imparts vertical support to the blade. The disks 78 and 80 preferably are keyed to a drive shaft 82 connected in a driven relationship with an electrically energizable motor 84. A suitable transmission, including gear box 86, is provided for establishing a selected angular rate for the disks.

The disks 78 and 80 are formed from any relatively soft material such as shim stock, or similar material, the hardness of which is less than the hardness of the blade 22. As a consequence, the guides 72, 74 and 76 do not significantly impair the cutting characteristics of the blade 22.

As indicated by the directional arrows shown in FIG. 2, the motor 84 angularly displaces the drive shaft 82 in a direction such that the disks continuously advance against the direction of travel of the blade 22. Importantly, it is to be understood that the disks are angularly displaced through only 180° during a period required for completing a slicing operation on the boules $B_1$ and $B_2$. Consequently, since the guides are driven throughout a cutting operation of a duration required for slicing through the boules, in a single slicing operation, the disks 78 and 80 continuously present to the cutting edge and adjacent surfaces of the blade 22 unscarred surfaces. Thus the blade 22 is supported at and near the cutting surface against wobble, thus enhancing the capability of the blade to form a narrow saw kerf in the adjacent boules and produce smooth surfaces with minimal waste of silicon.

Referring again to FIG. 2, it is noted that the guides 72 and 74 are driven in a common direction while the guides 74 and 76 are driven in opposite directions. Consequently, the blade 22 before entering a saw kerf formed in the boule $B_2$ is supported by the regenerated surfaces of the guide 72, and, subsequent to exiting the saw kerf formed in the boule $B_1$, is again supported by the unscarred surfaces of the disks 80 of the guide 74 before entering the kerf formed in the boule $B_1$. Thus control over blade wobble is greatly enhanced.

It also is noted that the guide 76 is rotated in a counter-clockwise direction, opposite to the direction of rotation for the guides 74 and 76. This rotation also facilitates presentation of regenerated surfaces to the blade for reducing blade wobble. Consequently, while not shown, it is to be understood that where so desired a guide driven in a direction similar to the direction in which the guide 76 is driven may be interposed between the boule $B_2$ and the guide 74, downstream of the boule $B_2$, whereby further enhanced wobble control for the blade is achieved.

In practice, the blade 22 is approximately 0.005 to 0.006 inches thick and one inch wide so that when properly tensioned the blade produces a smooth cut. A smooth cut will, as a practical matter, result in less etching with attendant lower production costs. Additionally, due to the narrow width of the kerf, less material is wasted during the slicing operation.

While the blade 22 contains no teeth, as such, it should be noted that the blade is forced to pass over a knurling wheel 88 having ridges 90, the purpose of which is to deform the cutting edge of the blade 22 sufficiently for establishing serrations 90', along the cutting edge. The purpose of the serrations will hereinafter be more fully understood.

Unfortunately, the formation of serrations 90' result in an increased thickness of the cutting edge. Therefore, in order to reduce or remove the unwanted lateral deformation of the blade, for thus reducing its thickness, the blade 22 is passed through a bite 92 established between a pair of cylindrical surface rollers 94, FIGS. 4 and 5. As a consequence of passage through the bite 92 the thickness of the blade 22 in the vacinity of the serrations 90 is greatly reduced. As a practical matter, the rollers 94 comprise free running rollers the surfaces of which function as anvils. However, the rollers may be powered, where desired, without departing from the scope of the instant invention.

The primary purpose of the serrations 90 simply is to transport a cutting slurry from a slurry distribution system 96 to the boules $B_1$ and $B_2$ for facilitating a faster cutting operation. The slurry distribution system, as shown, includes a tank 98 which serves as a suitable slurry supply. The tank 98 is connected with a manifold 100 having projected therefrom a plurality of slurry discharge jets 102. These jets are disposed in vertically spaced relation with the blade 22 and serve to discharge onto the blades gravitating flows of cutting slurry. Cutting slurrys include carbide or diamond dust suspended in carriers such as water, oil and/or other suitable materials. While the slurry discharged from the jets 102 is not herein specifically identified, it is to be understood that the slurry comprises any one of several fluids which enhance the cutting operation of the blade 22.

Unfortunately, slurry remaining adhered to the blade 22 as it advances beyond the cutting station tends to cause excessive wear on the surfaces of the system. In order to reduce potential damage a pneumatic system 104 is provided for removing the slurry. This system includes a plurality of manifolds 106 disposed above the blades 22 having downwardly directed jets 108 attached thereto. The jets 108 are directed toward the blades and serve to sweep the blades clean of unwanted slurry. Additionally, vacuum heads 110 are disposed immediately beneath the jets 108 for receiving the slurry as it is swept from the blades 22. In practice, the heads 110 are connected with a filtering system, not shown, and the slurry is returned to the source supply 98 through suitable conduits, not shown.

OPERATION

It is believed that in view of the foregoing descripion, the operation of the device will readily be understood however, it will, in the interest of completeness, be briefly reviewed at this point.

With the system assembled in the manner hereinbefore described, each of the subsystems 10 through 20 is disposed in close proximity and is adapted to be operated simultaneously for slicing a plurality of wafers from the boules $B_1$ and $B_2$. The subassemblies 10 through 20 are arranged in side-by-side relation for simultaneous operation.

Prior to initiating operation of the system, boules $B_1$ and $B_2$ are placed upon the cradle 64 and elevated through rotation operation of the jack screws 66 for positioning the boules in simultaneous engagement with the blades 22 of each of the subassemblies 10 through 20.

It is imperative that the blades 22 be properly tensioned. This tensioning of the blades may be achieved imperically by adjusting the nuts 54, whereby the drums are suitably positioned for thus suitably tensioning the blades 22. Of course, while the tensioning of the blades can be established imperically it is possible to utilize instrumentation, such as potentiometers, for this purpose.

With the system assembled and thus prepared for operation, the motors 32 and the motor 84 are energized whereupon the blades 22 are caused to advance, unidirectionally. The guides 72, 74 and 76 are thus caused to rotate in a proper direction for causing the cutting edges of the blades 22 to engage regenerated guide surfaces at the cutting station. Of course, the boules $B_1$ and $B_2$ are elevated at a proper rate simply by rotating the screws 66 at a proper rate. As the blades 22 progress toward the boules $B_1$ and $B_2$ they pass beneath the discharge jets 102 whereupon a slurry is deposited thereon and carried by the serrations 90' formed in response to a prior engagement thereof with the knurling wheel 88. Since the blades are effectively supported against wobble, by the guides 72 through 76, and the blades are properly tensioned, the blades 22 simultaneously form multiple saw kerfs through the boules $B_1$ and $B_2$ for simultaneously slicing a plurality of wafers therefrom. Of course, in order to reduce the tendency of the system to experience undue wear, the jets 108 expel a cleaning fluid to impinge upon the blades 22 for sweeping the blades clean of slurry. The slurry thus removed from the blades ultimately is accepted by the vacuum heads 110 and returned to the supply 98.

Additionally, continued operation of the system permits the blades 22 to pass over the knurling wheel 88 for again forming serrations 90' in the cutting edge of the blades. The serrations 90' also pass through the bite 92 of the rollers 94 for reducing the thickness in the cutting edge, introduced by the knurling wheel 88. Thus the cutting edge is dressed.

In view of the foregoing, it should now be apparent that the system which embodies the principles of the instant invention provides for a rapid simultaneous cutting of a plurality of silicon wafers, which required minimal etching for solar cell production, with an attendant reduction in loss of silicon material resulting from the cutting operation.

What is claimed is:

1. In a system including a cutting station for slicing a plurality of silicon wafers simultaneously from a plurality of boules during a single cutting operation, the improvement comprising:

A. a ganged band saw including a plurality of endless band saw blades supported for simultaneous operation and arranged in side-by-side coplanar relation;

B. means for imparting simultaneous unidirectional linear travel to each of said blades;

C. means adjacently related to a cutting station for simultaneously feeding to said ganged band saw a plurality of boules of silicon arranged in spaced coplanar relation;

D. means for reducing blade wobble including a plurality of guide means disposed in juxtaposition with the cutting station for receiving said blades in supported relation, each of said guide means being characterized by a pair of coaxially spaced disks supported in engaged relation with opposite side surfaces of one blade of said plurality; and E. means for angularly advancing said pair of disks in a direction opposing said unidirectional travel at a linear speed less than the rate of unidirectional travel of the blade.

2. In a system for slicing from a boule of silicon a plurality of silicon wafers in a single slicing operation, the improvement comprising:

A. at least one endless band saw blade trained about a pair of mutually spaced drums and supported thereby for driven unidirectional travel along a pair of courses extended in mutual parallelism across a boule of silicon and characterized by a cutting surface for simultaneously forming in said boule a pair of saw kerfs;

B. means for reconditioning the cutting surface of said blade including a knurling wheel disposed in engaged relation with the cutting surface for establishing serrations therealong, and means for reducing the thickness of the blade adjacent to the cutting surface comprising a pair of rollers characterized by a pair of cylindrical surfaces having defined therebetween a bite for receiving said blade in an engaged relationship;

C. a pair of angularly displaceable guides for supporting said blade near the midportion of each of said courses, the guides of said pair being spaced apart a distance sufficient to receive therebetween said boule of silicon; and D. means for continuously advancing said guides in angular displacement for regenerating the surfaces of the guides disposed in engaged relation with the blades in juxtaposed relation with the cutting edge thereof.

3. The improvement of claim 2 wherein each of said guides comprises a pair of disks of a first diameter disposed in coaxially spaced alignment having disposed therebetween a disk of a second diameter less than said first diameter, and means supporting said disks for angular displacement at a rate such that the guides are displaced through 180° of angular displacement for each slicing operation.

4. The improvement of claim 3 wherein each of said disks is fabricated from a material the hardness of which is less than that of the blade.

5. The improvement of claim 2 further comprising first means for continuously depositing on contiguous portions of said blade a cutting slurry and second means for continuously removing the slurry from the portions of the blade.

6. The improvement of claim 5 further comprising means for elevating said boule at a rate sufficient to maintain the boule in contacting engagement with the cutting surfaces.

7. The improvement of claim 6 wherein said blade comprises one of a plurality of similar endless band saw blades trained about a plurality of pairs of mutually spaced drums with the courses therefor being uniformly spaced for simultaneously forming a plurality of uniformly spaced saw kerfs.

8. A system for simultaneously slicing from a plurality of boules a plurality of silicon wafers of uniform thickness during a single cutting operation comprising:

A. means for supporting a plurality of boules of silicon in side-by-side spaced parallelism;

B. a plurality of endless band saw blades, each blade of said plurality being trained about a pair of mutually spaced drums and supported thereby for unidirectional travel from an upstream direction to a downstream direction relative to said boules along a pair of courses traversing the boules in spaced parallelism;

C. each blade of said plurality of blades having defined along one edge surface thereof a cutting edge for forming simultaneously in said boules pairs of saw kerfs extended transversely through the boules in spaced parallelism with pairs of saw kerfs formed by other blades of said plurality;

D. a plurality of angularly displaceable regenerative guides each being adapted to receive one blade of the plurality of blades, said guides being so arranged relative to the boules of the plurality as to position a first plurality of guides in an upstream relation with the boules and a second plurality of guides in a downstream relation with the boules;

E. means for continuously driving the guides of said first plurality of guides in angular displacement in an upstream direction for continuously presenting to the cutting edge of each blade in upstream relation with each boule a surface previously unengaged by said blade;

F. means for continuously depositing on the blades of said plurality a cutting slurry; and G. means for removing cutting slurry from the blades of said plurality.

9. A system as defined in claim 8 wherein each guide includes a pair of coaxially spaced disks of a first diameter for receiving a blade therebetween and a disk of a second diameter less than said first diameter interposed between the disk of said pair for supporting the blade at the cutting edge thereof, each of said disks being fabricated from a material of a hardness less than the hardness of the blade received between the disks of said pair.

* * * * *